(12) United States Patent
Witte (10) Patent No.: US 12,090,973 B2
(45) Date of Patent: Sep. 17, 2024

(54) BRAKE SYSTEM FOR A TRANSPORTATION VEHICLE AND TRANSPORTATION VEHICLE WITH A BRAKE SYSTEM

(71) Applicant: VOLKSWAGEN AKTIENGESELLSCHAFT, Wolfsburg (DE)

(72) Inventor: Bastian Witte, Groß Schwülper (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 16/719,443

(22) Filed: Dec. 18, 2019

(65) Prior Publication Data
US 2020/0198611 A1 Jun. 25, 2020

(30) Foreign Application Priority Data
Dec. 21, 2018 (DE) ...................... 10 2018 222 757.8

(51) Int. Cl.
| | | |
|---|---|---|
| *B60T 13/58* | (2006.01) | |
| *B60T 8/17* | (2006.01) | |
| *B60T 13/68* | (2006.01) | |
| *B60T 13/74* | (2006.01) | |

(52) U.S. Cl.
CPC ............ *B60T 13/58* (2013.01); *B60T 8/17* (2013.01); *B60T 13/686* (2013.01); *B60T 13/74* (2013.01); *B60T 2270/402* (2013.01); *B60T 2270/413* (2013.01)

(58) Field of Classification Search
CPC ......... B60T 2270/402; B60T 2270/403; B60T 2270/406; B60T 2270/413; B60T 2270/414; B60T 8/88; B60T 8/92; B60T 13/58; B60T 13/686; B60T 13/74; B60T 8/17
See application file for complete search history.

(56) References Cited

U.S. PATENT DOCUMENTS 3,985,210 A * 10/1976 Hodge ................ B60T 17/22
                                                                 188/170
6,582,030 B2   6/2003  Harris
8,746,419 B2   6/2014  Roll et al.
(Continued)

FOREIGN PATENT DOCUMENTS

DE            60003310 T2    4/2004
DE         102008009043 B3    5/2009
(Continued)

*Primary Examiner* — Robert A. Siconolfi
*Assistant Examiner* — San M Aung
(74) *Attorney, Agent, or Firm* — Barnes & Thornburg LLP (57) ABSTRACT

A brake system for a transportation vehicle and a transportation vehicle having such a brake system. The brake system includes two brake circuits which each have a control unit and a battery, wherein the respective control unit actuates two of a total of four service brakes and at least one of at least two electric parking brakes. The brake system also has an electronic circuit element. The brake system forms a defect signal in response to a double fault affecting the two brake circuits and when a defect in at least one of the control units is detected, and/or in which a respective supply voltage of at least one of the control units drops below a predefined limiting value. The at least one electronic circuit element actuates the electric parking brakes when a defect signal is formed.

8 Claims, 3 Drawing Sheets

(56) References Cited

U.S. PATENT DOCUMENTS

| | | | |
|---|---|---|---|
| 9,555,788 B2 | 1/2017 | Brok et al. | |
| 9,802,596 B2 | 10/2017 | Binder et al. | |
| 10,953,862 B2 | 3/2021 | Rebholz-Goldmann et al. | |
| 11,312,346 B2 | 4/2022 | Michels et al. | |
| 2002/0103584 A1* | 8/2002 | Babala | G01L 15/00 |
| | | | 701/29.2 |
| 2006/0212135 A1* | 9/2006 | Degoul | B60T 8/3255 |
| | | | 700/20 |
| 2010/0198473 A1* | 8/2010 | Strengert | B60T 17/221 |
| | | | 701/70 |
| 2017/0072920 A1 | 3/2017 | Besier et al. | |
| 2018/0079398 A1* | 3/2018 | Baehrle-Miller | B60T 7/12 |
| 2020/0055506 A1* | 2/2020 | Michels | F16D 65/18 |
| 2021/0129817 A1* | 5/2021 | Michels | B60T 8/1755 |

FOREIGN PATENT DOCUMENTS

| | | | |
|---|---|---|---|
| DE | 102010003232 A1 | 10/2010 | |
| DE | 102013017688 A1 | 4/2014 | |
| DE | 102015206572 A1 | 11/2015 | |
| DE | 102014214375 A1 | 1/2016 | |
| DE | 102014221901 A1 | 4/2016 | |
| DE | 102017204157 A1 | 9/2018 | |
| DE | 102017003650 A1 | 10/2018 | |
| DE | 102017209319 A1 | 12/2018 | |
| EP | 2719593 A1 | 4/2014 | |
| EP | 2977282 A1 | 1/2016 | |
| JP | 2015116921 A * | 6/2015 | |
| WO | WO-2008092683 A1 * | 8/2008 | B60T 13/04 |
| WO | 2018188901 A1 | 10/2018 | |

\* cited by examiner

BRAKE SYSTEM FOR A TRANSPORTATION VEHICLE AND TRANSPORTATION VEHICLE WITH A BRAKE SYSTEM

PRIORITY CLAIM

This patent application claims priority to German Patent Application No. 10 2018 222 757.8, filed 21 Dec. 2018, the disclosure of which is incorporated herein by reference in its entirety.

SUMMARY

Illustrative embodiments relate to a brake system for a transportation vehicle and to a transportation vehicle having such a brake system.

BRIEF DESCRIPTION OF THE DRAWINGS

Exemplary embodiments are described in more detail below with reference to the drawings, in which.

DETAILED DESCRIPTION

A transportation vehicle usually has a service brake, embodied, for example, as a hydraulic brake, on each of its wheels. In addition to this, the transportation vehicle nowadays is equipped with at least two electromechanical parking brakes which are arranged, for example, on respective wheels of a front axle, or typically of a rear axle, of the transportation vehicle.

EP 2 977 282 A1 describes a brake system which comprises two brake circuits. These two brake circuits each comprise two of a total of four hydraulic brakes of the transportation vehicle which are each arranged on wheels, arranged diagonally with respect to one another, of the transportation vehicle. Each of these two service brakes is additionally assigned one of the two electric parking brakes which may be arranged on, in each case, one of the two wheels of the rear axle of the transportation vehicle. In this context, each brake circuit is assigned that parking brake of the two parking brakes which is arranged on the rear wheel on which a hydraulic brake of this brake circuit is not arranged. Therefore, in each case the brakes on three wheels can be actuated by each of the two brake circuits. If, for example, one of the two brake circuits then fails, for example, owing to a defect, each rear wheel of the transportation vehicle can continue to be braked by the other brake circuit, specifically either with the corresponding hydraulic brake or the electric parking brake of the other, non-defective parking brake, depending on which rear wheel is involved. Therefore, in the case of a single fault relating to one of the brake circuits the brake system continues to be functionally capable.

EP 2 719 593 A1 describes a brake system of a vehicle which comprises two separate brake circuits. Each of these brake circuits has a pressure-generating device which is supplied with electrical energy by a separate energy source. If a defect is then detected in one of the two brake circuits, the faulty brake circuit can be deactivated and the functionally capable brake circuit can be activated.

DE 600 03 310 T2 describes an electrohydraulic brake system which comprises an electric parking brake means to permit the brake devices of the electrohydraulic brake system to be able to be actuated for parking brake purposes.

The standard ECE-R13H which is valid for a brake system of a passenger car differs between a service brake effect (6.44 meters per square second minimum deceleration, to be satisfied with an intact brake system) and an auxiliary braking effect (2.4 meters per square second minimum deceleration, to be satisfied in the case of any random single defect in the brake system). There are no specifications for two faults which are independent of one another. However, combinations are possible in which the passenger car can no longer brake at all, since, for example, a brake pedal sticks and/or a handbrake cable is torn. Standard ECE-R13, which is comparable with the latter, applies to heavy utility vehicles.

The disclosed embodiments are based on the problem that a transportation vehicle which is configured for fully autonomous driving will in future no longer necessarily have a brake pedal which could be actuated, for example, by a user of the transportation vehicle. This results in the fact that in the case of one defect, or even two defects which are independent of one another, in the brake system of such a transportation vehicle, it should continue to be possible to brake the brake system by at least one additional fallback device. The brake system should therefore have sufficient redundancies always to be able to brake the transportation vehicle, specifically ideally:

with a service braking effect in the case of a fault-free brake system, also with a service braking effect in the case of any random fault, and with an auxiliary braking effect in the case of any random combination of two faults which are independent of one another.

The disclosed embodiments make available a solution by which, even in the case of a double fault in a brake system of a transportation vehicle, the brake system continues to be functionally capable to carry out at least one auxiliary braking operation.

These requirements therefore go far beyond the contemporary requirements from ECE-R13H.

One solution is possible given knowledge of the disclosed embodiments in that parking brakes of the transportation vehicle are actuated independently of a functional capability of the control units of the brake circuits of the brake system.

The disclosed brake system for a transportation vehicle is based here on the known arrangement in which four service brakes which are each assigned to a wheel of the transportation vehicle, at least two electric parking brakes which are assigned to respective wheels of the transportation vehicle, two control units and two batteries are present. In addition, the transportation vehicle can comprise a central electric generator for supplying electrical energy to the transportation vehicle, which generator is referred to in everyday language as a dynamo. According to the disclosed embodiments, a brake is to be understood as being a device by which kinetic energy of one of the wheels of the transportation vehicle is converted into thermal energy, as result of which the kinetic energy is dissipated. This brakes a rotation of the wheel. In the case of a passenger car, the four service brakes which are assigned to the respective wheels may be embodied as brakes which are actuated hydraulically or in future, for example, as brakes which are actuated electromechanically, and in the case of a heavy utility vehicle, as brakes which are actuated pneumatically. Each service brake can be respectively embodied, for example, as a drum brake or a disk brake. The at least two electric parking brakes can each be embodied as electromechanical parking brakes, that is to say as electrically actuated brakes. In the case of a heavy utility vehicle, for example, spring-loaded brakes are actuated electro-pneumatically as parking brakes. The further illustration is provided using the example of a passenger car as a transportation vehicle with hydraulic service brakes and electromechanical parking brakes. However, the disclosed embodiments also apply correspondingly to the other types of brake.

The disclosed brake system is divided in the known way into two independent brake circuits. The two control units are configured each to control one of the brake circuits. This respective brake circuit comprises two of the service brakes, that is to say, for example, two hydraulic brakes and at least one of the electric parking brakes, wherein each of the brakes of the brake system is assigned to one of the brake circuits, and therefore is actuated by in each case precisely one of the two control units. The two batteries are configured to supply electrical energy to one of the brake circuits of the brake system in each case. The respective batteries can be supplied with electrical energy here, for example, by the central electrical generator of the transportation vehicle. In the case of electric transportation vehicles and hybrid transportation vehicles, the central electrical generator can be embodied as a DC converter for converting the high voltage of the electric traction drive into low voltage. A transportation vehicle on-board electrical system voltage is typically 12 volts DC voltage in the case of a passenger car and 24 volts DC voltage in the case of a truck. In total, there are therefore three electrical energy sources available for the brake system.

Taking this brake system with two separate brake circuits which are independent of one another as a starting point it is possible, in the event of failure of one of the brake circuits, for example, if one of the control units or one of the batteries fails, to carry out a braking maneuver with the transportation vehicle by the remaining brake circuit in the way described at the beginning. The disclosure now expands this redundancy to the effect that protection is provided against double faults which relate to both brake circuits.

The brake circuit is configured to form a defect signal if a double fault which affects the two brake circuit and which comprises a defect in at least one of the control units is detected, and/or in which a respective supply voltage of at least one of the control units drops below a predefined limiting value. The brake system also comprises at least one electronic circuit element which is configured to actuate the electric parking brakes of the brake system when a defect system is formed or is present. The at least one electronic circuit element may be disconnected from the two control units of the brake circuit and is embodied, for example, as a further control unit of the brake system. The brake system is therefore configured, in the event of a double fault in the brake system during which both brake circuits can no longer be actuated via the respective control unit, to generate the defect signal to which the at least one electronic circuit element reacts. The defect signal can be formed, for example, by the two respective control units of the two brake circuits of the brake system. Additionally or alternatively to this, the at least one electronic circuit element can be configured to detect a defect in the brake circuits itself, wherein the defect signal is formed by at least one electronic circuit element itself. Therefore, if a double fault is detected, this information is ultimately signaled by the defect signal to the at least one electronic circuit element. To monitor the respective functional capability of the respective control unit of the respective brake circuit it is possible, for example, to provide a so-called watchdog function, such as, for example, an intelligent watchdog or a time-out watchdog, and/or what is referred to as a heartbeat monitoring facility in the brake system, which facility can detect the respective failure of the control unit and form the defect signal in response thereto. An interruption in the supply of electricity to the brake circuit can be detected by a voltage monitoring facility.

The defect signal is made available, for example, if the two control units of the respective brake circuits detect that their energy supply is no longer sufficient to operate them, since, for example, an interruption has occurred in a supply line. Additionally or alternatively to this, at least one software error or hardware fault can occur within the respective control unit, which can also be detected. Any desired combinations of at least two respective defects are possible here, wherein each of the brake circuits is effected by at least one of the defects.

The at least one circuit element can therefore actuate the at least two parking brakes of the brake system independently of the control units of the two brake circuits. The at least one electronic circuit element is correspondingly configured to actuate the electric parking brakes as soon as the defect signal has been formed or received, that is to say if a fault has actually occurred or been detected simultaneously in both brake circuits. By the at least one electronic circuit element it is therefore possible to ensure that the brake system continues to brake the transportation vehicle, since it continues to be possible to actuate at least the electric parking brakes by which the transportation vehicle can be braked when appropriate.

The disclosed brake system therefore constitutes a brake system with expanded availability, since it is double-fault-tolerant and despite the double fault continues to permit targeted braking of the transportation vehicle. This is useful in the case of transportation vehicles without a brake pedal for assisting the braking capability because as result of the elimination of the brake pedal an emergency braking function which was previously present in the transportation vehicle by braking by the driver is no longer available but when electric parking brakes are present this function can be replaced by the at least one electronic circuit element.

The disclosure also comprises refinements which provide additional benefits.

In at least one disclosed embodiment there is provision that the at least one electronic circuit element is embodied as an application-oriented, integrated circuit. The at least one electronic circuit element is therefore embodied as an ASIC (application-specific integrated circuit), that is to say as an electronic circuit which has been implemented as an integrated circuit. Corresponding logic functions are integrated into this ASIC so that it is configured to actuate the electric parking brakes. In addition it is configured to evaluate the defect signal which is made available, for example, by the respective control units of the two brake circuits, and to activate in response thereto, that is to say perform the actuation of the parking brakes. The at least one electronic circuit element is also configured to be supplied with electrical energy from the respective battery independently of the respective control unit and the respective service brakes. An energy supply of the at least one electronic circuit element is therefore independent of an energy supply of the two control units and of the total of four service brakes. The at least one electronic circuit element is ultimately configured to supply the electric parking brake with energy from the battery independently of an energy supply of the respective control unit and of the respective service brakes. In this context in each of the two brake circuits it is possible to provide a separate electronic circuit element or a common circuit element for both brake circuits. The configuration as an ASIC results in adaptation of the circuit to the specific problem of the actuation of the parking brakes in reaction to a double fault and therefore in a more efficient and rapid execution as a functionally identical implementation in an additional control unit. This therefore permits the at least one electronic circuit element of the brake system to be implemented in a simple way.

In a further disclosed embodiment there is provision that in each of the brake circuits the battery is connected to the service brakes and to the control unit by a main plug connector. In contrast, in each of the service brakes the battery is connected to the parking brake by a parking brake plug connector which is mechanically decoupled from the main plug connector. In this context, the brake system optionally comprises in total just one parking brake plug connector via which both batteries are coupled to the respective electric parking brake.

The brake system comprises in this case three plug connectors, of which two respectively couple one of the batteries to the respective service brakes and the respective control unit of one of the brake circuits. In addition, the brake system comprises a parking brake plug connector which is mechanically decoupled from the main plug connectors and is configured to couple the respective batteries of the brake circuits at least indirectly to the corresponding parking brake. If the respective main plug connector in one of the brake circuits is then defective or no longer plugged in to such an extent that it connects electrically, the respective supply voltage of the control unit can drop below the predefined limiting value so that, if, for example, a defect also occurs in the control unit in the other brake circuit and/or the corresponding main plug connector is defective or not plugged in, the defect signal is made available to the at least one electronic circuit element and the parking brakes can be actuated. The mechanically decoupled parking brake plug connector then always makes electrical supply of the parking brakes possible. This ultimately makes it possible for the electric parking brakes to be capable of being actuated by the at least one electronic circuit element in accordance with the defect signal. Furthermore, the number of plug connectors in the brake system can nevertheless be kept small, as result of which the brake system can be implemented in a cost-effective way.

In at least one disclosed embodiment there is provision that the respective brake circuit comprises, for the purpose of actuating the respective service brakes, a valve device and a pump. These are configured in each of the brake circuits to control a flow of a braking medium flowing through the brake circuit. Such valve devices and pumps are described in detail, for example, in EP 2 977 282 A1 mentioned at the beginning in relation to a brake system, comprising two brake circuits. In a fault-free situation the valve device and the pump of each of the brake circuits are each actuated by the control unit of the respective brake circuit. The energy supply is provided via the main plug connector of the brake circuit to the battery of the brake circuit. The valve device and the pump are therefore each coupled to the battery via the main plug connector.

In at least one disclosed embodiment there is provision that in each of the brake circuits a supply of electricity to the pump and/or to the valve device is coupled to a supply of electricity to the control unit via a rectifier device. The rectifier device is configured to permit a unidirectional flow of current to the control unit. The rectifier device can be embodied, for example, as a diode which is directed in its forward direction toward the control unit. As an alternative to this, the rectifier device can be a transistor which is configured to be switched as an ideal diode, that is to say the switched state of the transistor (electrically conductive or nonconductive) is switched by a switching logic in accordance with an orientation of the electrical voltage which drops across the transistor, to model the switching behavior of an ideal diode. Therefore, in each of the brake circuits, for example, an electrical supply line between the main plug connector and the pump and/or the valve device is coupled by a connecting line to an electrical supply line between the main plug connector and the control unit. The lines are each meant to refer to, for example, a wire or a conductor track.

If the electrical supply line which leads directly to the control unit is interrupted, it can also be possible that the control unit is still supplied with electrical energy from the battery via the connecting line, specifically via the connecting line of the pump or of the valve device. The control unit from each of the brake circuits is therefore configured to be able to be operated by redundant circuitry composed of a plurality of voltage supplies, which permits, for example, in the case of a triggered fuse in the electrical supply of one of the control units, further energy supply to this control unit to be ensured.

In a further disclosed embodiment there is provision that in each of the brake circuits a supply of electricity to the electric parking brake is coupled to the supply of electricity to the control unit via a rectifier device. The rectifier device can be configured in the way described above. The rectifier device can therefore be embodied, for example, as a diode which is directed in its forward direction toward the control unit. For example, in each of the brake circuits an electrical supply line between the parking brake plug connector and the electric parking brake can be coupled by a connecting line to the electric supply line between the main plug connector and the control unit. This connecting line comprises, for example, the diode. The control unit can therefore be supplied redundantly using the supply of the electricity to the parking brake.

In at least one disclosed embodiment there is provision that the brake system comprises just one common electronic circuit element, as has already been mentioned above. In each of the brake circuits, the supply of electricity to the electrical parking brake of the brake circuit is then coupled to a supply of electricity to the common electronic circuit element via a rectifier device. This rectifier device can also be configured in a way which has already been described. The rectifier device can therefore be embodied, for example, as a diode which is directed in its forward direction with respect to the common electronic circuit element. Therefore, for example, in each of the brake circuits an electrical supply line between the parking brake plug connector and the electric parking brake can be coupled by a connecting line to the common electronic circuit element. The connecting line comprises, for example, the diode. The common electronic circuit element can therefore be supplied with electrical energy from the batteries by both batteries via a common parking brake plug connector. As a result, a brake system which is cost-effective to implement is made possible, since only one electronic circuit element is installed in the brake system, but nevertheless the same functional capability is given in the case of double faults in the brake system when two separate circuit elements were to be installed.

The disclosed embodiments also relates to a transportation vehicle having a brake system such as has been described above. The refinements which are presented in relation to the disclosed brake system, and the benefits thereof, apply correspondingly, where applicable, to the disclosed transportation vehicle.

In the exemplary embodiments, the described components of the embodiments each represent individual features of the disclosure which can be considered independently of one another and which each also develop the disclosed embodiments independently of each other. Therefore, the disclosure is also to comprise other combinations of the features of the embodiments than those illustrated. Furthermore, the described embodiments can also be supplemented by further features of the disclosure which have already been described.

In the figures, functionally identical elements are each provided with the same reference symbols.

Figure 1:
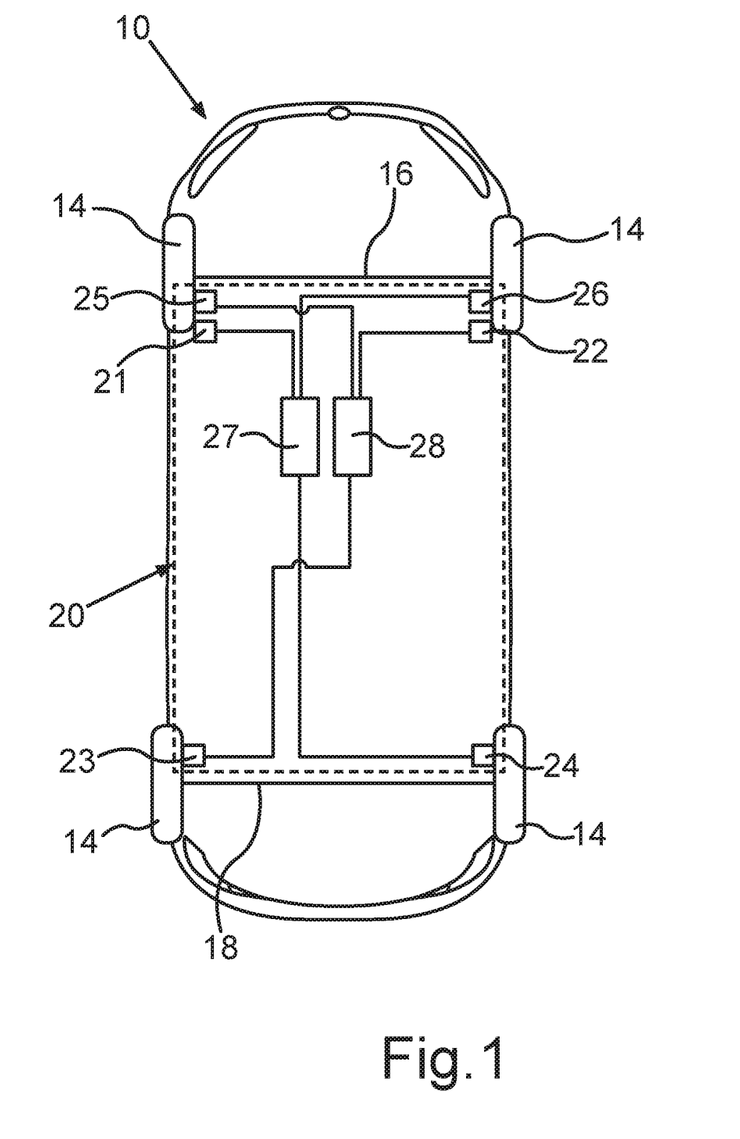
FIG. 1 shows a schematic illustration of a transportation vehicle having a brake system.

FIG. 1 is a diagram of a transportation vehicle 10 which has four wheels 14, two on a front axle 16 and two on a rear axle 18. The transportation vehicle 10 can for this purpose be configured to carry out autonomous travel, that is to say travel without manual guidance of a driver of the transportation vehicle 10. The transportation vehicle 10 has a brake system 20, wherein the brake system 20 has four service brakes 21, 22, 23, 24 which are each assigned to one of the wheels 14 of the transportation vehicle 10 and are embodied in this exemplary embodiment as hydraulic brakes 21, 22, 23 and 24, as well as two electric parking brakes 25 and 26 which are assigned to respective wheels 14 of the front axle 16. In this context, the hydraulic brake 21 is arranged on the front left wheel 14, the hydraulic brake 22 is arranged on the front right wheel 14, the hydraulic brake 23 is arranged on the rear left wheel 14 and the hydraulic brake 24 is arranged on the rear right wheel 14. The electric parking brake 25 is assigned to the front left wheel 14, while the electric parking brake 26 is assigned to the front right wheel 14. The two electric parking brakes 25 and 26 are assigned to respective wheels 14 of the front axle 16 of the transportation vehicle 10.

In addition, the brake system 20 comprises two control units 27 and 28. The respective control units 27, 28 are each configured to actuate one of the service brakes of the brake system 20 in each case. The respective brake circuit comprises two of the hydraulic brakes 21, 22, 23, 24 and one of the electric parking brakes 25, 26. In this context, each of the brakes 21 to 26 of the brake system 20 can be actuated by precisely one of the two control units 27, 28, in each case. The first brake circuit comprises here the control unit 27, the hydraulic brakes 21 and 24 and the electric parking brake 26. In contrast, the second brake circuit comprises the control unit 28, the hydraulic brakes 22 and 23 and the electric parking brake 25.

Figure 2:
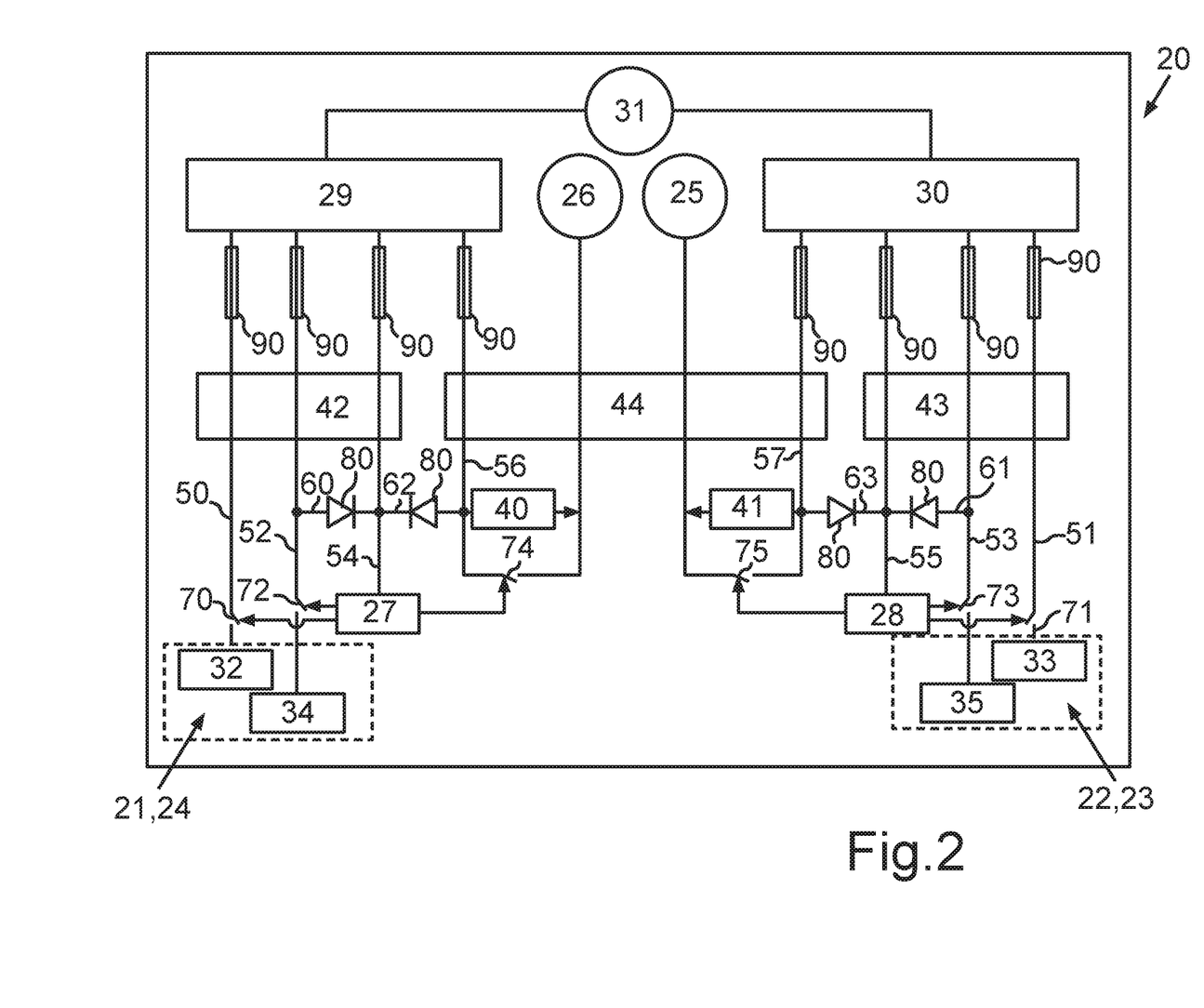
FIG. 2 shows a schematic diagram of a brake system for a transportation vehicle comprising two electronic circuit elements.

FIG. 2 shows a schematic circuit diagram of the brake system 20. From the diagram it becomes clear that each of the brake circuits of the brake system 20 comprises, for actuating the respective service brakes 21, 22, 23, 24, a valve device 32, 33 and a pump 34, 35 which are configured, in each of the brake circuits, to control a flow of a braking medium flowing through the brake circuit. In each of the valve devices 32, 33, in this context typically one inlet valve and one outlet valve are assigned to each wheel 14 for individual pressure control. In addition, each brake circuit comprises a battery 29, 30 for supplying the respective brake circuit of the brake system 20 with electrical energy. The two batteries 29, 30 of the brake system 20 are also supplied with electrical energy by a generator 31 of the transportation vehicle 10. Each of the brake circuits furthermore comprises an electrical circuit element 40, 41, which is embodied, for example, as an application-oriented integrated circuit (ASIC) and is configured to be supplied with electrical energy from the battery 29, 30 independently of the control unit 27, 28 and the service brakes 21, 22, 23, 24.

In each of the brake circuits, the battery 29, 30 is at least indirectly coupled to the service brakes 21, 22, 23, 24, that is to say to the valve device 32, 33 and to the pump 34, 35, and to the control unit 27, 28, by a main plug connector 42, 43. In this context, in each brake circuit the valve device 32, 33 and the pump 34, 35 can be respectively actuated by the control unit 27, 28. This actuation is represented here with a respective power semiconductor or power semiconductor switch 70, 71, 72, 73. A power semiconductor switch can be implemented for example, on the basis of at least one MOSFET or IGBT. The respective control unit 27, 28 is configured to actuate the respective power semiconductor switch 70, 71, 72, 73 and as a result to control the energy supply of the valve device 32, 33 and of the pump 34, 35. The control unit 27, 28, which is configured to actuate the respective brake circuit both as a control unit and as a monitoring unit, and can therefore, for example, transmit a chronologically modulated braking torque to the wheels 14 of the transportation vehicle 10 by the respective brakes 21, 22, 23, 24 of the brake system 20, to be precise on the basis of corresponding actuation of the power semiconductor switches 70, 71, 72, 73. This makes it possible that in a normal operating mode, that is to say at a time at which no defect signal is present, the transportation vehicle 10 can be braked by the two control units 27, 28 and the two brake circuits, independently, for example, of brake signals of a central control device of the transportation vehicle 10.

In each of the brake circuits, an electrical line 52, 53 between the main plug connector 42, 43 and the power semiconductor switch 72, 73 is coupled upstream of the pump 34, 35 by a connecting line 60, 61 to the electrical line 54, 55 between the main plug connector 42, 43 and the control unit 27, 28. Alternatively or additionally to this, an electrical line 50, 51, for example, between the main plug connector 42, 43 and the power semiconductor switch 70, 71 in each brake circuit can be coupled upstream of the valve device 32, 33 by the connecting line 60, 61 to the electrical line 54, 55 between the main plug connector 42, 43 and the control unit 27, 28. The respective connecting line 60, 61 comprises in each case a diode 80 whose forward direction is directed toward the control unit 27, 28. In each of the brake circuits, a supply of electricity to the pump 34, 35 and/or to the valve device 32, 33 is therefore coupled to a supply of electricity to the control unit 27, 28 via the diode 80. As an alternative to the diode 80, another rectifier device can be provided which is configured to permit only a unidirectional flow of current to the control unit 27, 28.

In addition, the brake system 20 comprises a common parking brake plug connector 44 for both brake circuits. In each of the brake circuits, the battery 29, 30 is at least indirectly coupled to the parking brake 25, 26 by the single parking brake plug connector 44 which is mechanically decoupled from the main plug connector 42, 43. In each of the brake circuits, the electrical line 56, 57 between the parking brake plug connector 44 and the electrical parking brake 25, 26 is coupled by a connecting line 62, 63 to the electrical line 54, 55 between the main plug connector 42, 43 and the control unit 27, 28. This connecting line 62, 63 also comprises a diode 80 whose forward direction is directed toward the control unit 27, 28. In each of the brake circuits, a supply of electricity to the parking brake 25, 26 is therefore coupled to the supply of electricity to the control unit 27, 28 via the diode 80. As an alternative to the diode 80, another rectifier device can be provided which is configured to permit only a unidirectional flow of current to the control unit 27, 28.

In addition, the electrical line 56, 57 between the parking brake plug connector 44 and the electric parking brake 25, 26 in each of the brake circuits comprises a power semiconductor switch 74, 75, wherein the control unit 27, 28 is configured to actuate this power semiconductor switch 74, 75 and as a result alternately open and close the electrical line 56, 57. By this power semiconductor switch 74, 75 it is possible, for example, to carry out the actuation of the parking brakes 25, 26 by the control unit 27, 28 in each brake circuit.

In addition, respective terminals 90 and fuses are arranged in the respective electrical lines 50, 51, 52, 53, 54, 55, 56, 57, between the respective battery 29, 30 and the respective main plug connectors 42, 43 or the parking brake plug connector 44.

The brake system 20 is configured to form a defect signal. This defect signal is formed whenever a defect occurs in the control unit 27, 28 in the two brake circuits and/or a respective supply voltage of the control unit 27, 28 drops below a predefined limiting value. The latter occurs, for example, when the main plug connector 42, 43 is defective or not plugged in. The defect in the control unit 27, 28 is, for example, a software error or a hardware fault in the corresponding control unit 27, 28. For the defect signal to be formed, there must therefore be an electrical fault present in both brake circuits, that is to say a so-called double fault must occur in the brake system 20. For example, in the first brake circuit a defect can occur in the first control unit 27, since in the latter a software fault has occurred and at the same time dropping of the supply voltage of the second control unit 28 has been observed in the second brake circuit, since a defect has occurred in the electrical connection 55 between the battery 30 and the second control unit 28. In such a situation, the defect signal is formed. If the electronic circuit elements 40, 41 have received the defect signal, that is to say if the defect signal which is formed is present, they subsequently actuate the electric parking brakes 25, 26 so that the brake system 20 continues to be functionally capable, and the transportation vehicle 10 can be braked if appropriate.

Figure 3:
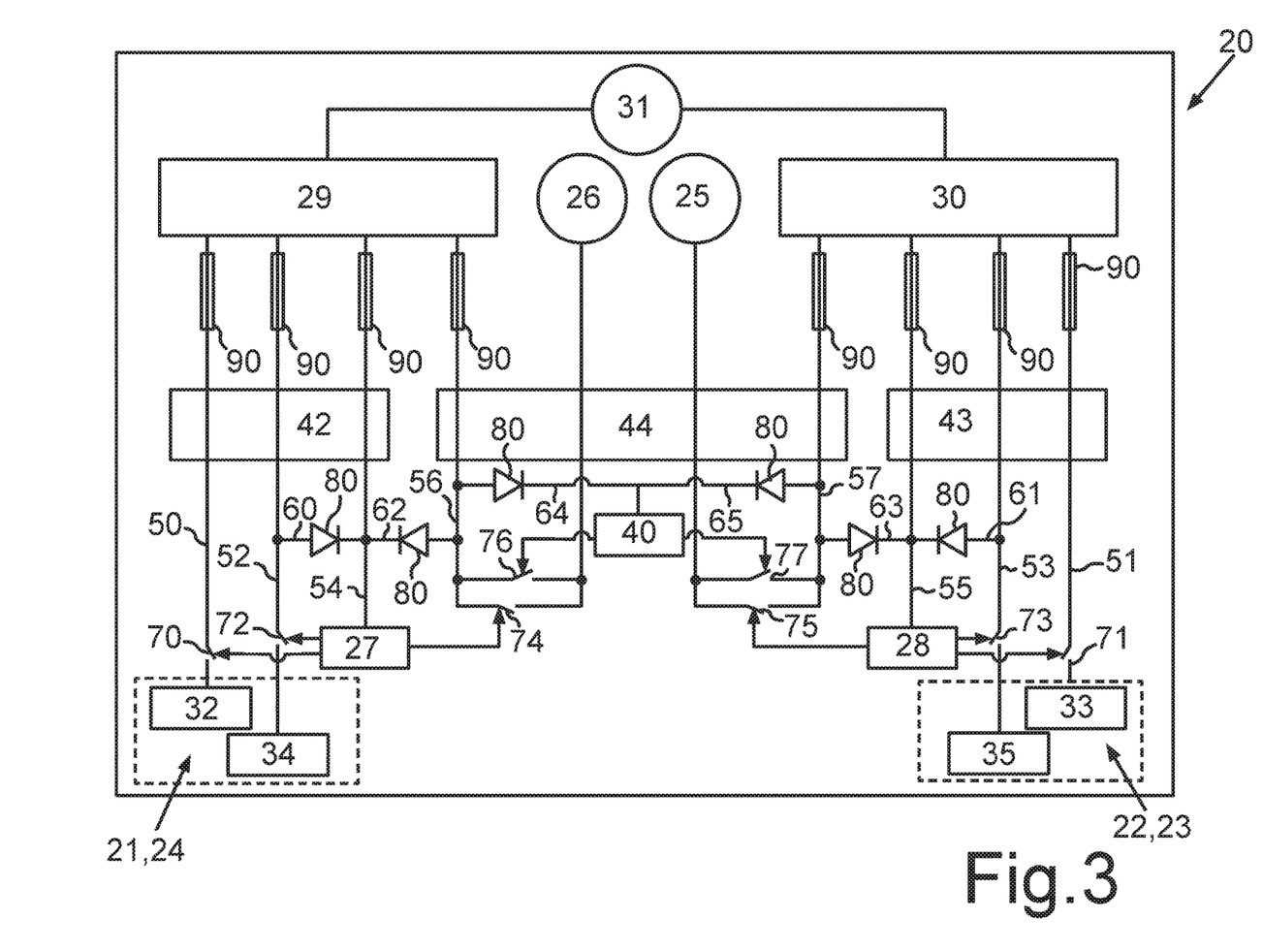
FIG. 3 shows a schematic diagram of a brake system for a transportation vehicle comprising one common electronic circuit element.

FIG. 3 illustrates a further example of a circuit diagram of the brake system 20, when this brake system 20 comprises just one common electronic circuit element 40. In each of the brake circuits, the electrical line 56, 57 between the parking brake plug connector 44 and the electric parking brake 25, 26 is coupled to the common electronic circuit element 40 by the connecting line 64, 65. The respective connecting line 64, 65 comprises the diode 80 whose forward direction is directed toward the common electronic circuit element 40. As an alternative to the diode 80, another rectifier device can be provided which is configured to only permit a unidirectional flow of current to the common electronic circuit element 40.

In addition, in each of the brake circuits, a further power semiconductor switch 76, 77 is arranged parallel to the power semiconductor switches 74, 75. This power semiconductor switch 76, 77 is configured in each brake circuit to alternately open and close the electrical line 56, 57, wherein the common electronic circuit element 40 is then configured to actuate these power semiconductor switches 76, 77, and therefore, for example, to permit an energy supply for the electric parking brake 25, 26, for example, after reception of the defect signal. By this power semiconductor switch 76, 77 it is therefore possible, for example, to carry out the actuation of the parking brakes 25, 26 by the common electronic circuit element 40.

If then, for example, a software error occurs in the control unit 27 and in addition to a defect in the main plug connector 43, the defect signal which is made available to the common electronic circuit element 40 is formed in the brake system 20. In this context, it is possible, for example, that the respective control units 27, 28 transmit respective status signals to the electronic circuit element 40 at predefined time intervals, and as soon as these status signals fail to occur this is evaluated as a defect signal. In the electronic circuit element 40 and/or the respective control units 27, 28 it is therefore possible to provide a watchdog function which monitors the function of the respective control unit 27, 28 and therefore as soon as the double fault has occurred a defect signal is formed and subsequently the common electronic circuit element 40 (or if appropriate the two electronic circuit elements 40, 41) actuates the electric parking brakes 25, 26. If, for example, just a single fault occurs at one of the brake circuits, the respective other brake circuit would perform the braking of the transportation vehicle 10. Only in the case of a double fault which affects each of the two brake circuits, is the parking brake 25, 26 actuated by the electric circuit element 40, 41.

Overall, the examples show a possible way of wiring a fail-operational brake system, that is to say a brake system which continues to operate in the event of a fault, for a transportation vehicle which, for example, does not have a brake pedal.

LIST OF REFERENCE NUMBERS

10 Transportation vehicle
14 Wheel
16 Front axle
18 Rear axle
21-24 Service brake
25, 26 Parking brake
27, 28 Control unit
29, 30 Battery
31 Generator
32, 33 Valve device
34, 35 Pump
40, 41 Electronic circuit element
42, 43 Main plug connector
44 Parking brake plug connector
50-57 Electrical line
60-65 Connecting line
70-77 Power semiconductor switch
80 Diode
90 Terminal

The invention claimed is:

1. A brake system for a transportation vehicle, the brake system being configured to perform at least one auxiliary braking operation, the brake system comprising:
   an independent control unit configuration including only two independent control units; and
   two brake circuits, wherein each of the two brake circuit comprises two service brakes and an electric parking brake, wherein each one of the service brakes is assigned to a wheel of the transportation vehicle, wherein each one of the electric parking brakes is assigned to respective wheels of the transportation vehicle, and wherein the each of the two independent control units of the independent control unit configuration are configured to independently actuate brakes of a respective brake circuit of the two brake circuits;

two batteries for supplying electrical energy to respective ones of the two brake circuits, wherein, in response to detection of a concurrent fault that affects brake circuit functionality such that the two independent control units of the independent control unit configuration of the brake system are incapable of functionally controlling actuation of the service brakes of the two brake circuits, the brake system forms and outputs a concurrent fault defect signal, wherein the concurrent fault is a result of:

defect detection in the two independent control units of the independent control unit configuration that affects both of the two independent control units so as to disable functional control of the service brakes of the brake circuits by each of the two independent control units of the independent control unit configuration in the brake system; and/or defect detection in at least one of the two independent control units along with detection of a drop in supply voltage of the other of the two independent control units below a predefined limiting value so as to disable functional control of the service brakes of the brake circuits by the two independent control units in the brake system, and at least one electronic circuit element which actuates the electric parking brakes of the two brake circuits in response to receipt of the concurrent fault defect signal;

whereby, even following concurrent fault detection, the brake system continues to be functional to perform at least one auxiliary braking operation during which the at least one circuit element actuates the at least two parking brakes of the brake system independently of the two non-functioning independent control units of the independent control unit configuration.

2. The brake system of claim 1, wherein the at least one electronic circuit element is an application-oriented, integrated circuit and is independently supplied with battery stored electrical energy independently of a supply of battery stored electrical energy to the two independent control units of the independent control unit configuration and the respective service brakes.

3. The brake system of claim 1, wherein, in each of the two brake circuits, the battery provided for the brake circuit is connected to the service brakes and the respective independent control unit of the independent control unit configuration by a main plug connector, and wherein, the battery provided for each brake circuit is connected to the at least one parking brake of the brake circuit by a parking brake plug connector mechanically decoupled from the main plug connector.

4. The brake system of claim 3, wherein each of the two brake circuits further comprise a valve for actuating the two service brakes included in the respective brake circuit and a pump configured to control a flow of a braking medium flowing through the respective brake circuit, wherein the valve and pump in each of the to brake circuits is actuated by the respective independent control unit of the independent control unit configuration and coupled to the respective battery via the main plug connector of the respective brake circuit.

5. The brake system of claim 4, wherein, each of the two brake circuits includes a rectifier that is coupled to the pump and/or the valve of the electric circuit to supply battery stored electrical energy via the respective independent control unit, wherein the rectifier permits only a unidirectional flow of current to the respective independent control unit of the independent control unit configuration from the respective battery.

6. The brake system of claim 1, wherein, each of the two brake circuits includes a rectifier that is coupled to the electric parking brake of the brake circuit to supply battery stored electrical energy via the respective independent control unit of the independent control unit configuration, wherein the rectifier permits only a unidirectional flow of current to the respective independent control unit of the independent control unit configuration from the respective battery.

7. The brake system of claim 1, further comprising a single, common electronic circuit element, wherein, each of the two brake circuits includes a rectifier that is coupled to the electric parking brake of the brake circuit to supply battery stored electrical energy via the common electronic circuit element, wherein the rectifier of each of the two brake circuits permits only a unidirectional flow of current to the common electronic circuit element from the two batteries in the brake system.

8. A transportation vehicle comprising the brake system of claim 1.

* * * * *